US008200984B2

(12) United States Patent
Esfandabadi

(10) Patent No.: US 8,200,984 B2
(45) Date of Patent: Jun. 12, 2012

(54) DATA TRANSMISSION IN AN ARRANGEMENT COMPRISING A TACHOGRAPH

(75) Inventor: Riaz Hemmat Esfandabadi, Königsfeld-Neuhausen (DE)

(73) Assignee: Continental Automotive GmbH, Hannover (DE)

( * ) Notice: Subject to any disclaimer, the term of this patent is extended or adjusted under 35 U.S.C. 154(b) by 889 days.

(21) Appl. No.: 11/571,215

(22) PCT Filed: May 25, 2005

(86) PCT No.: PCT/EP2005/052394
§ 371 (c)(1),
(2), (4) Date: Dec. 22, 2006

(87) PCT Pub. No.: WO2006/000507
PCT Pub. Date: Jan. 5, 2006

(65) Prior Publication Data

US 2008/0059701 A1 Mar. 6, 2008

(30) Foreign Application Priority Data

Jun. 25, 2004 (DE) ......................... 10 2004 030 869

(51) Int. Cl.
*H04L 29/06* (2006.01)

(52) U.S. Cl. .................... 713/189; 340/870.16; 701/117

(58) Field of Classification Search ................... 713/189
See application file for complete search history.

(56) References Cited

U.S. PATENT DOCUMENTS 4,188,618 A * 2/1980 Weisbart .................. 340/870.16
5,721,678 A 2/1998 Widl ........................ 364/424.04
6,109,520 A * 8/2000 Ricard ........................ 235/30 R
6,141,609 A * 10/2000 Herdeg et al. ................... 701/35
6,198,996 B1 * 3/2001 Berstis ............................ 701/36
6,385,677 B1 5/2002 Yao ............................... 710/102
6,816,707 B1 * 11/2004 Barker et al. ................ 455/41.2
6,892,942 B1 * 5/2005 Widl et al. .................... 235/384
7,379,541 B2 * 5/2008 Iggulden et al. ......... 379/102.03
7,913,258 B2 * 3/2011 Konno et al. ................. 718/102
2002/0183905 A1 12/2002 Maeda et al. ................... 701/35
2003/0142473 A1 * 7/2003 Blersch ......................... 361/683
2003/0187571 A1 * 10/2003 Impson et al. ................ 701/117
2004/0217176 A1 * 11/2004 Wahler .......................... 235/480

(Continued)

FOREIGN PATENT DOCUMENTS

CN 1312931 A 9/2001

(Continued)

OTHER PUBLICATIONS

On the security of Digital Tachograph, Anderson, 1998, Cambridge.*

(Continued)

*Primary Examiner* — Taghi Arani
*Assistant Examiner* — Gregory Lane
(74) *Attorney, Agent, or Firm* — King & Spalding L.L.P.

(57) ABSTRACT

An arrangement has a tachograph, an external mobile data memory device with an external second interface, the interface corresponding with the first interface, for providing data transmission. For safety reasons, conventional arrangements provide for a complete mechanical isolation of the memory device during transmission, the memory device being configured as a data card. In order to reduce cost without compromising safety, the tachograph has a first encoding unit associated to an interface of the tachograph and the data memory device has a second encoding unit to enable data transmission in encoded form.

8 Claims, 3 Drawing Sheets

U.S. PATENT DOCUMENTS

| | | | | |
|---|---|---|---|---|
| 2005/0097338 | A1 | 5/2005 | Lee | 713/186 |
| 2006/0201073 | A1 * | 9/2006 | Kirner et al. | 52/79.1 |
| 2006/0235580 | A1 | 10/2006 | Weiss et al. | 701/2 |

FOREIGN PATENT DOCUMENTS

| | | | |
|---|---|---|---|
| DD | 269 477 | A1 | 6/1989 |
| DE | 198 07 479 | A1 | 8/1999 |
| DE | 198 37 488 | A1 | 2/2000 |
| DE | 299 18 443 | U1 | 2/2000 |
| DE | 100 21 733 | A1 | 11/2001 |
| DE | 201 12 392 | U1 | 8/2002 |
| DE | 102 10 320 | A1 | 11/2002 |
| DE | 10202743 | | 12/2002 |
| DE | 102 54 284 | A1 | 1/2004 |
| EP | 0 762 339 | A2 | 3/1997 |
| EP | 1 102 172 | A1 | 5/2001 |
| EP | 1437690 | | 7/2004 |
| JP | 10293726 | | 11/1998 |
| JP | 2003168006 | | 6/2003 |
| JP | 2004115252 | | 4/2004 |
| JP | 2007502460 | | 2/2007 |
| RU | 2 136 047 | C1 | 8/1999 |
| RU | 2 221 277 | C1 | 1/2004 |
| WO | 99/66455 | A2 | 12/1999 |
| WO | 2006/000507 | A1 | 1/2006 |

OTHER PUBLICATIONS

Brooks, "Automobile Security Concerns", Jun. 2009, IEEE Vehicular Technology Magazine, pp. 53-64.*

German Office Action for Application No. 102004030869.1-53 (2 pages), Nov. 19, 2007.

German Office Action for German Patent Application No. 10 2004 030 869.1 (4 pages), Feb. 7, 2005.

International Search Report and Written Opinion for International Patent Application No. PCT/EP2005/052394 (13 pages), Aug. 31, 2005.

International Provisional Examination Report for International Patent Application No. PCT/EP2005/052394 (13 pages), Nov. 20, 2006.

Russian Office Action, Russian application No. 2007102685, 6 pages, May 12, 2009.

Russian Office Action, Russian application No. 2007102685, 15 pages, Oct. 1, 2009.

Chinese Office Action, Chinese application No. 200580020869.1, 11 pages, Nov. 6, 2009.

* cited by examiner

DATA TRANSMISSION IN AN ARRANGEMENT COMPRISING A TACHOGRAPH

CROSS-REFERENCE TO RELATED APPLICATIONS

This application is a U.S. national stage application of International Application No. PCT/EP2005/052394 filed May 25, 2005, which designates the United States of America, and claims priority to German application number 10 2004 030 869.1 filed Jun. 25, 2004, the contents of which are hereby incorporated by reference in their entirety.

TECHNICAL FIELD

The invention relates to an arrangement comprising a tachograph which stores driver-related data digitally in an internal first memory, with a mobile external data memory device which has a second memory, with an external first interface at the tachograph and an external second interface at the external memory device which corresponds with the first interface so that data can be transmitted between the first interface and the second interface. In addition, a method for transmitting data from a tachograph which stores driver-related data digitally in an internal memory to a mobile data memory device by means of an external first interface at the tachograph and an external second interface at the external memory device which corresponds with the first interface so that data can be transmitted between the first interface and the second interface, is the subject matter of the invention.

BACKGROUND

The new generation of tachographs does not store data by recording on a paper record chart as previously but in digital form electronically in a memory. The so called digital tachograph to be introduced shortly on the market operates with an internal memory and a chip card, that is to say an external storage medium, when storing the data. The chip card is completely accommodated by the digital tachograph and is completely isolated from the environment by means of mechanical provisions during the data transmission between the internal memory of the tachograph and the memory of the chip card. This is intended to prevent manipulations. The advantage of using a chip card consists in that the latter can be completely isolated from the environment. However, the great expenditure associated with the isolation during the data transmission is disadvantageous. The data card must be accommodated completely by the digital tachograph which, accordingly, must have a device for automatically receiving and delivering. In addition, it must be possible to close the opening through which the data card enters into the tachograph securely against manipulation and relevant regulations require that this shutter is locked in the closed position. The high degree of mechanical security precautions against manipulation is associated with high costs and great complexity.

SUMMARY

It is the object of the invention to render an arrangement and a method of the type initially mentioned to be less complex and more inexpensive without compromises with regard to the security against manipulation.

To achieve the object, it is proposed according to the invention that the tachograph has a first encrypting unit which is associated with the first external interface and the memory device has a second encrypting unit which is associated with the second external interface so that data can be transmitted encrypted between the first interface and the second interface. In addition, the invention proposes a method of the type initially mentioned in which the tachograph has a first encrypting unit which is associated with the first external interface and the memory device has a second encrypting unit which is associated with the second external interface and data which are transmitted from the tachograph to the memory device are encrypted by means of the first encrypting unit before the transmission and data which are transmitted from the memory device to the tachograph are encrypted by means of the second encrypting unit before the transmission. Compared with the known digital tachograph, both the arrangement according to the invention and the method according to the invention have the serious advantage that mechanical protection against manipulations, particularly a protection of electrical contacts of the first interface and the second interface, is obsolete. Due to the elimination of the very complex chip card mechanism for pulling in and delivering the data card, the costs are considerably lowered and the space required by the device is distinctly reduced. The keys for ejecting the chip cards needed in a conventional digital tachograph are no longer required which advantageously creates further space on the front panel for additional operating elements. In addition, the life of the overall device is no longer limited by the sensitive mechanism. According to the invention, the protection against manipulation is exclusively provided by the encryption before the data transmission. Picking up electrical signals with manipulatory intent, therefore, will not lead to the desired success. The second memory of the external memory device can be suitably between 32 MBytes and 2 GBytes. Memory space not needed for the core application can be suitably used for other applications. The encryption can be carried out advantageously by means of triple-DES (data encryption standard) and asymmetric RSA encryption algorithms.

An advantageous development of the invention provides that the first external interface and the second external interface are constructed in such a manner that they can form a plug-in connection with one another via which data can be transmitted. Such an embodiment is particularly simple and rugged and can be carried out by means of relevant plug-in connections, for example, the plug-in connection can be constructed as RS232. Such a plug-in connection is particularly suitably constructed as USB (universal serial bus) connection wherein, in particular, the first interface at the tachograph can be constructed as socket and the second interface at the memory device can be constructed as plug. The construction as USB interface results in an advantageously high transmission rate and, at the same time, this arrangement is particularly rugged mechanically, particularly if, as preferred, the socket is arranged at the tachograph and the plug is arranged at the external memory device. In this manner, there is no element protruding at the tachograph either. A further increase in stability and additional increase in the life of the overall arrangement is obtained when the first external interface and the second external interface are constructed in such a manner that they can exchange data with one another cablelessly. This option, which is only obtained with the association according to the invention of encrypting units with the interfaces has the advantage, on the one hand, that no plug-in capability for the interface connection needs to be provided at the front panel of the tachograph and, on the other end, it results in much more convenient handling of both devices. For the cableless data transmission according to the arrangement according to the invention or the method according to the invention, the two interfaces involved can be suitably constructed as wireless USB or Bluetooth chip arrangements. When using a wireless USB connection, data transmission can already take place at a distance of 50 m. In addition such an arrangement is also particularly inexpensive compared with Bluetooth. A wireless USB connection can be suitably produced in accordance with the WUSB standard.

The data memory device can be advantageously supplied with the required operating power by means of an integrated transponder.

To obtain limitless flexibility, the external memory device, in turn, can have an exchangeable storage medium so that, in particular, driver-related data can also be moved independently of the external memory device. In this manner, the external memory device can essentially have the function of an adapter or of a terminal for transmitting data from the memory of a tachograph to an exchangeable storage medium, wherein the external storage medium essentially takes over the function of encryption. A further advantage of this arrangement lies in the fact that the memory device now only needs to be provided for each tachograph in operation and it is no longer necessary for each user to have a separate device.

So that the user can conveniently check the correct operation of the memory device, it is suitable if the latter has at least one light-emitting means which emits light or flashes depending on whether a data transmission is taking place. A second light-emitting means could be additionally used as indicator for a correct voltage supply.

Particularly in the case where the two interfaces are constructed as plug-in connection, it is suitable if this connection is constructed in such a manner that the memory device is supplied with operating power from the tachograph. In this manner, the correct operation is no longer dependent on the charge state of a battery in the memory device.

To avoid false associations of memory devices with vehicles or drivers, it is appropriate if man-readable information is applied as print on the memory device. This can be, for example, an identification number which is allocated to the vehicle driver. For particularly convenient handling, the external memory device is suitably constructed in small format and provided at the place where the printed-on man-readable information is located with a transparent layer domed in the direction of a reader, which allows the print to appear optically larger and thus facilitates the reading. So that an unauthorized user does not obtain access to encrypted data, either, it is suitable that after a connection has been established between the first interface and the second interface, the tachograph requests a user to input a code by means of which the user authenticates himself. It is only after this authentication code has been input correctly that data transmission is possible.

BRIEF DESCRIPTION OF THE DRAWINGS

In the text which follows, the invention is explained in greater detail by means of two exemplary embodiments, referring to the drawings in which.

DETAILED DESCRIPTION

Figure 1:
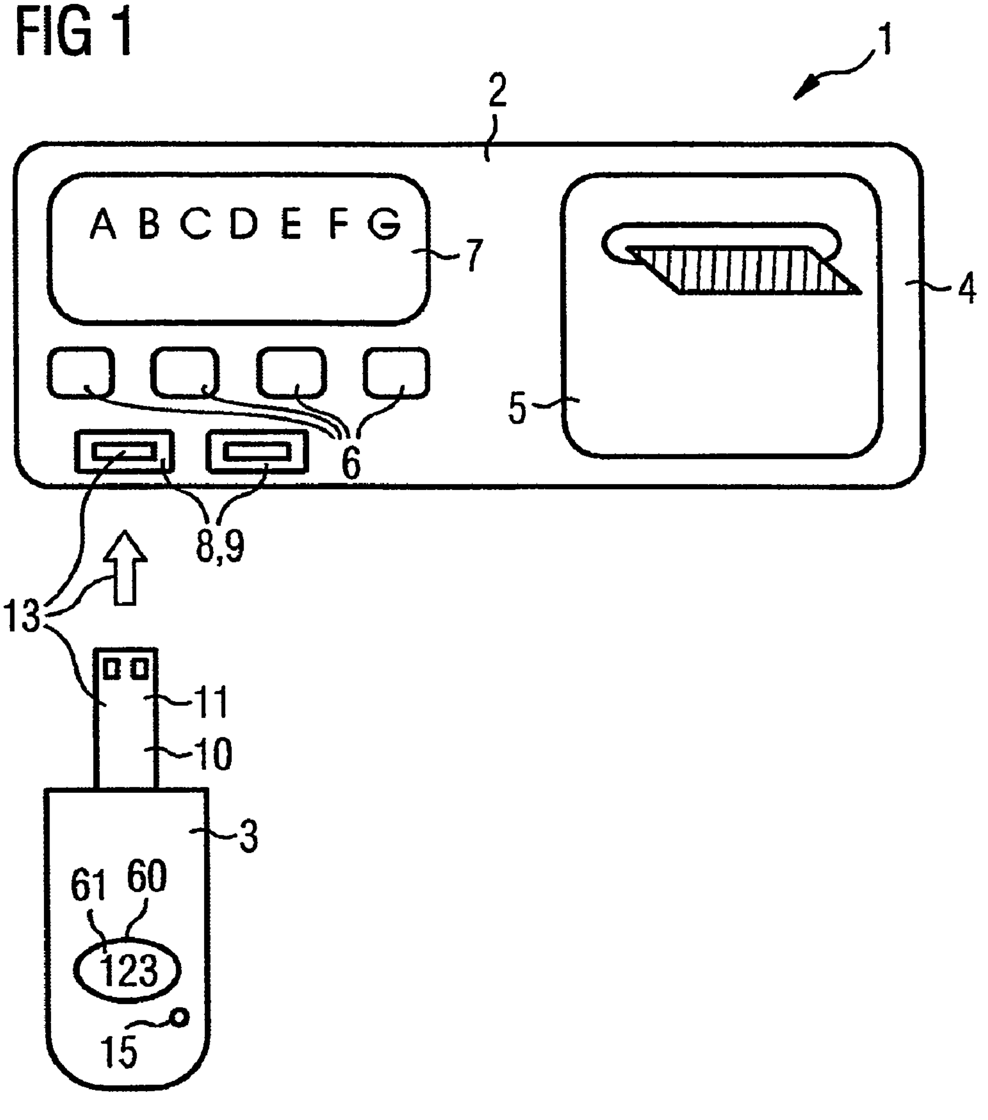
FIG. 1 shows a diagrammatic representation of an arrangement according to the invention comprising a digital tachograph and an external memory device which can be connected to one another by means of a plug-in connection.
Figure 2:
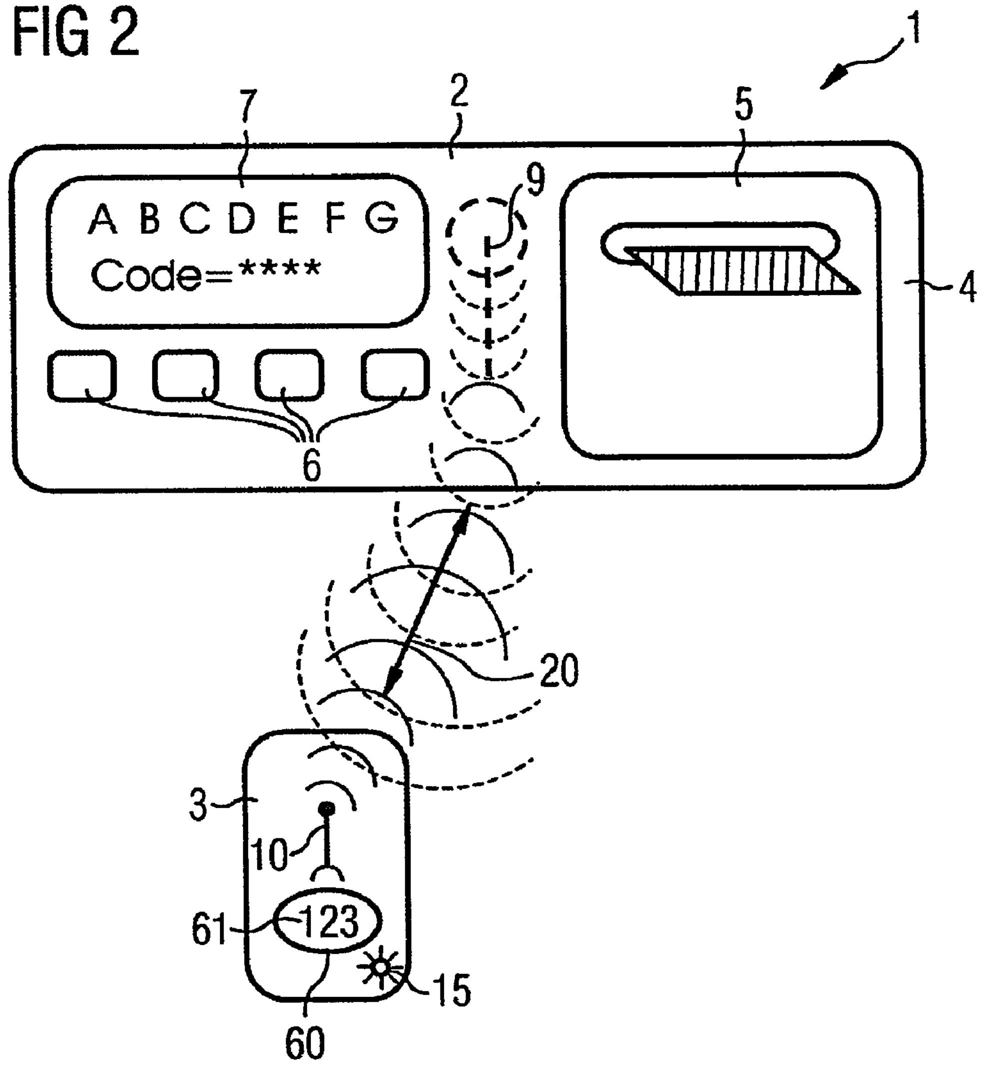
FIG. 2 shows an arrangement comprising a digital tachograph and an external memory device in a diagrammatic representation with cableless data transmission.

The arrangements 1 according to the invention, shown in FIGS. 1 and 2, comprise a digital tachograph 2 and in each case an external data memory device 3. The digital tachograph 2 is shown in a front view, a front panel 4 exhibiting a printer drawer 5, various operating elements 6, a display 7 and two first interfaces 9 constructed as socket 8.

The data memory device 3 is provided with a second interface 10 constructed as plug 11 which corresponds with the first interface 8 in such a manner that plugging the plug 11 into the socket 8 establishes a plug-in connection and contacts of the first interface 9 establish an electrically conductive connection with contacts of the second interface 10. The resultant plug-in connection 13 is constructed as universal serial bus.

The data memory device 3 is equipped with a light-emitting means 15 which, by flashing, indicates to a user that a data transmission is taking place.

The exemplary embodiment of the invention, shown in FIG. 2, essentially corresponds to that of FIG. 1, wherein the first interface 9 and the second interface 10 exchange data with one another by means of a cableless connection 20.

The data memory device 3 is provided with writing 61 covered with a transparent layer 60 domed in the direction of a reader. The layer 60 optically enlarges the writing 61 in a manner comparable to a lens.

Figure 3:
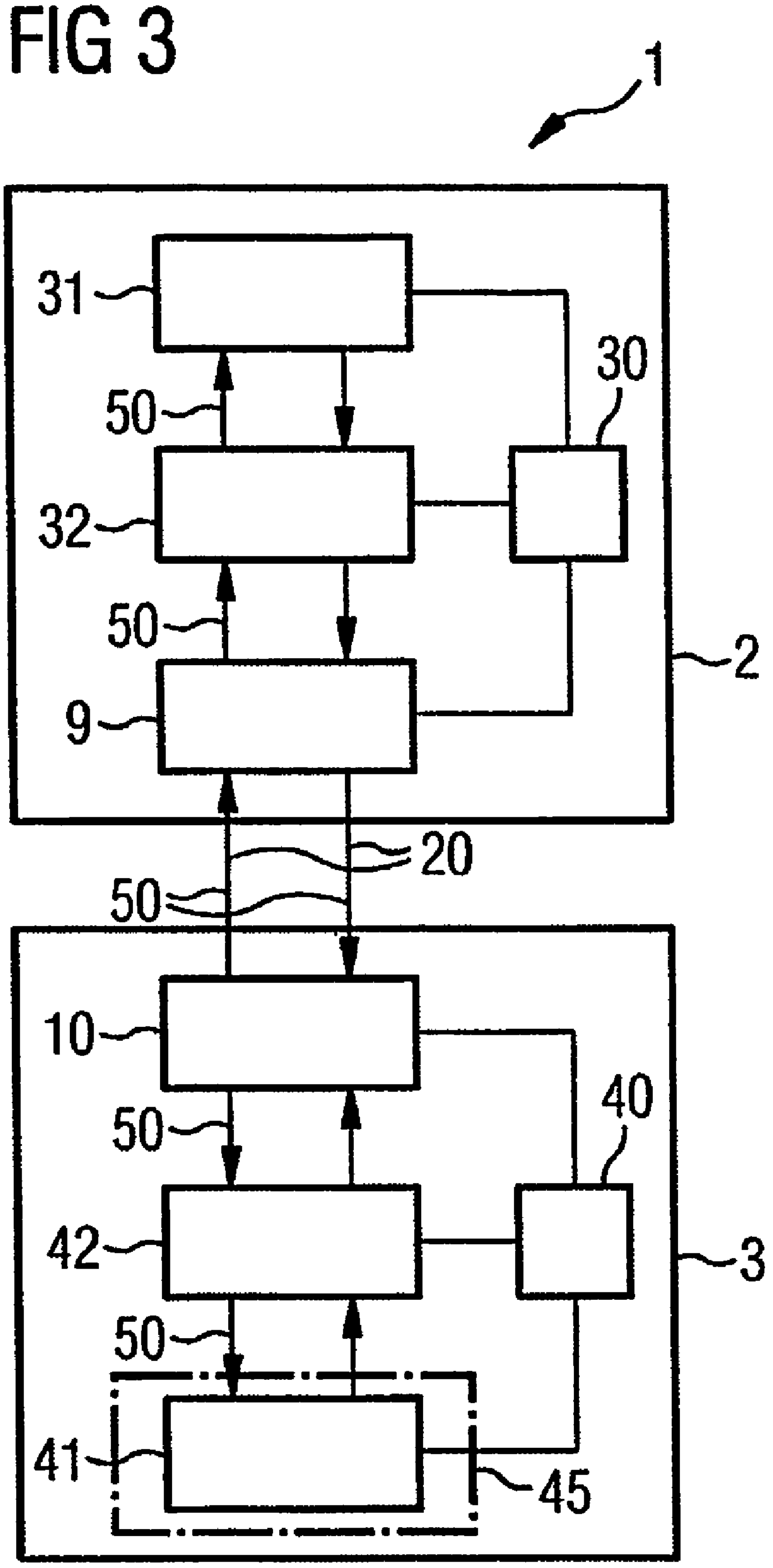
FIG. 3 shows a diagrammatic representation of the operation of an arrangement according to the invention and of the method according to the invention, respectively.

In the diagrammatic representation of the operational relationships of the arrangement 1 of FIG. 3, the tachograph 2 has a connection 20 to the data memory device 3 for data transmission. The tachograph 2 has a first processor 30 which has a controlling, monitoring or regulating connection to a first memory 31, a first encrypting unit 32 and a first interface 9. The data memory device 3 similarly has a second processor 40 which has a controlling, regulating or monitoring connection to a second memory 41, a second encrypting unit 42 and the second interface 10. The second memory 41 is a storage medium 45 which can be separated from the data memory device 3. Data 50 transmitted by the tachograph 2 are conveyed under control of the first processor 30 from the first memory 31 to the first encrypting unit 32 where they are encrypted and then transferred from the first interface 9 to the second interface 10. Analogously, the second processor 40 controls a process in the data memory device 3 so that data 50 from the second memory 41, before being conveyed from the second interface 10 to the first interface 9, are first encrypted in the second encrypting unit 42.

What is claimed is:

1. A system comprising:

a tachograph which stores driver-related data digitally in an internal first memory, the tachograph including a USB socket;

a mobile external data memory device which has a second memory, the mobile external data memory device including a USB plug configured to be plugged directly into the USB socket of the tachograph so that data can be transmitted between the USB socket and the USB plug at a location physically inside the tachograph, wherein the second memory contains driver information and a unique encryption key;

wherein the tachograph has a first encrypting unit which is associated with the USB socket and the data memory device has a second encrypting unit which is associated with the USB plug so that data can be transmitted encrypted with the unique encryption key between the USB socket and the USB plug only after a user manually inputs a correct authentication code in order to authenticate the user, and wherein the USB socket and the USB plug are constructed in such a manner that they can exchange data with one another cablelessly.

2. The system according to claim 1, wherein the data memory device has an exchangeable storage medium.

3. The system according to claim 1, wherein the data memory device has at least one light-emitting means which emits light or flashes depending on whether a data transmission is taking place.

4. The system according to claim 1, wherein a connection between the USB socket and the USB plug is constructed in such a manner that the data memory device can be supplied with operating power by means of the connection.

5. The system according to claim 1, wherein man-readable information is applied as print on the data memory device.

6. The system according to claim 4, wherein the printed-on man-readable information is provided with a transparent layer domed in the direction of a reader, which allows the print to appear optically larger.

7. A method for transmitting data from a tachograph which stores driver-related data digitally in an internal first memory to a mobile data memory device by means of a USB socket formed in the tachograph and a USB plug formed on the external data memory device having a second memory which plugs into the USB socket formed in the tachograph so that data can be transmitted between the USB socket and the USB plug at a location physically inside the tachograph to be stored in the second memory, comprising the steps of:

requesting a user to manually enter an authentication code into the tachograph;

determining whether the user's entry matches a stored authentication code; only if the user's entry matches a stored authentication code, performing the steps of:

encrypting data which are transmitted by the tachograph to the data memory device by means of a first encrypting unit associated with the USB socket before the transmission, and encrypting data which are transmitted to the data memory device to the tachograph by means of a second encrypting unit associated with the USB plug before the transmission, and wherein data are exchanged cablelessly between the USB socket and the USB plug.

8. The method according to claim 7, wherein after a connection has been established between the USB socket and the USB plug, a user of the tachograph is requested to input a code by means of which the user authenticates himself.

* * * * *